United States Patent
Keh et al.

(10) Patent No.: US 9,235,112 B2
(45) Date of Patent: Jan. 12, 2016

(54) PROJECTOR AND METHOD FOR OPERATING THE PROJECTOR TO DISPLAY AT LEAST TWO DIFFERENT IMAGES

(75) Inventors: Yong-Chan Keh, Seoul (KR);
Byeong-Hoon Park, Suwon-si (KR);
Sung-Soon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 530 days.

(21) Appl. No.: 13/296,891

(22) Filed: Nov. 15, 2011

(65) Prior Publication Data

US 2012/0120374 A1  May 17, 2012

(30) Foreign Application Priority Data

Nov. 15, 2010  (KR) ................. 10-2010-0113139

(51) Int. Cl.
*G03B 21/20* (2006.01)
*G03B 21/28* (2006.01)
*H04N 9/31* (2006.01)

(52) U.S. Cl.
CPC .............. *G03B 21/28* (2013.01); *H04N 9/3147* (2013.01); *H04N 9/3173* (2013.01)

(58) Field of Classification Search
CPC ..... H04N 9/3147; H04N 9/3173; H04M 1/16; H04M 2250/54; G06F 1/1639; G03B 21/14; G03B 21/20
USPC ................. 353/85, 98; 348/740–771
See application file for complete search history.

(56) References Cited

U.S. PATENT DOCUMENTS

| | | | |
|---|---|---|---|
| 3,807,847 A * | 4/1974 | Okano | 353/71 |
| 5,028,128 A * | 7/1991 | Onuki | 353/122 |
| 7,173,605 B2 | 2/2007 | Fong et al. | |
| 2005/0225685 A1* | 10/2005 | Kim | 348/838 |
| 2006/0092338 A1* | 5/2006 | Sakai et al. | 348/744 |
| 2007/0171193 A1* | 7/2007 | Nakamura | 345/156 |
| 2008/0192208 A1* | 8/2008 | Benoit et al. | 353/85 |
| 2009/0107485 A1* | 4/2009 | Reznik et al. | 126/600 |
| 2009/0128716 A1 | 5/2009 | Nagashima et al. | |
| 2010/0103332 A1* | 4/2010 | Li et al. | 348/750 |
| 2010/0182516 A1* | 7/2010 | Chen et al. | 348/776 |
| 2010/0309232 A1* | 12/2010 | Wada et al. | 345/690 |
| 2011/0102688 A1* | 5/2011 | De Boer | 349/5 |

FOREIGN PATENT DOCUMENTS

| | | |
|---|---|---|
| JP | 2003101621 | 4/2003 |
| JP | 2004279847 | 10/2004 |
| JP | 2006295779 | 10/2006 |

* cited by examiner

*Primary Examiner* — Sultan Chowdhury
*Assistant Examiner* — Danell L Owens
(74) *Attorney, Agent, or Firm* — The Farrell Law Firm, P.C.

(57) ABSTRACT

A projector and a method for operating the projector are provided, in which an optical module alternately emits first image information and second image information at intervals, and an optical path switch is installed to be switched on or off from a traveling path of the first and second image information emitted from the optical module.

14 Claims, 3 Drawing Sheets

PROJECTOR AND METHOD FOR OPERATING THE PROJECTOR TO DISPLAY AT LEAST TWO DIFFERENT IMAGES

PRIORITY

This application claims priority under 35 U.S.C. §119(a) to a Korean Patent Application filed in the Korean Intellectual Property Office on Nov. 15, 2010 and assigned Serial No. 10-2010-0113139, the contents of which are incorporated herein by reference.

BACKGROUND OF THE INVENTION

1. Field of the Invention

The present invention relates generally to a projector, and more particularly, to a projector for displaying two different images by projecting different pieces of image information at different time points using a single optical module.

2. Description of the Related Art

A projector generally displays an image enlarged on a screen by projecting image information from an optical module to a screen separated from the optical module by a set distance. The size of an image displayed on the screen can be controlled according to the distance between the optical module and the screen. When a sufficient distance to the screen has been set, the projector can easily create a high-definition large screen irrespective of the size of the projector.

Recently, portable-size projectors have been commercialized and portable terminals such as mobile phones have been equipped with projectors. These devices are useful, for example, to office workers that are frequently out on business or in meetings.

The development trend of projectors is a dual-view function that enables simultaneous display of images on two or more screens using a single optical module.

FIG. 1 illustrates a conventional projector having a dual-view function, disclosed in U.S. Patent Publication No. 2009-0128716 to Nagashima et al, filed on Nov. 3, 2008. Referring to the reference numerals therein, the projector splits image information emitted from a 3-wavelength laser beam generator 350 into two paths through a beam splitter 383. First split image information is projected as a front image 132A on a screen 130 and second split image information is projected as a surface image 122A on a table 120.

The first and second image information is split from the same image information. Therefore, the images 132A and 122A projected onto the screen 130 and the table 120, respectively, are the same image. Compared to a projector that projects an image onto a single screen, the quality of the images projected onto the screen 130 and the table 120 is low and the projector is not optimally utilized.

SUMMARY OF THE INVENTION

An aspect of the present invention is to address at least the problems and/or disadvantages and to provide at least the advantages described below. Accordingly, an aspect of the present invention is to provide a projector for projecting different images simultaneously onto first and second screens, and a method for operating the projector.

Another aspect of the present invention is to provide a method for utilizing a projector in various manners by projecting different images onto first and second screens through the single projector.

In accordance with an aspect of the present invention, there is provided a projector for emitting a plurality of pieces of optical image information, in which an optical module alternately emits first image information and second image information at predetermined intervals, and an optical path switch is installed to be switched on or off from a traveling path of the first and second image information emitted from the optical module. While the first image information is being emitted, the optical path switch is switched off from the traveling path of the first and second image information, whereby the first image information travels straight in an emission path of the optical module, the emission path being a first path. While the second image information is being emitted, the optical path switch is switched on to the traveling path of the first and second image information, whereby the second image information travels in a second path by the optical path switch.

In accordance with another aspect of the present invention, there is provided a method for operating a projector, in which first image information is emitted from an optical module (first emission), the first image information being made to travel straight in a first path in which the first image information is emitted from the optical module by switching off an optical module from a traveling path of the emitted first image information, second image information is emitted from the optical module (second emission) and is switched from a path in which the second image information is emitted from the optical module to a second path by switching on the optical path switch to a traveling path of the second image information (second path control). The first emission and the first path control are simultaneously performed and the second emission and the second path control are simultaneously performed, and the first emission alternates with the second emission at intervals.

BRIEF DESCRIPTION OF THE DRAWINGS

The above and other objects, features and advantages of embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Reference will now be made in detail to embodiments of the present invention with reference to the accompanying drawings. In addition, a detailed description of a generally known functions and structures of the present invention will be omitted for the sake of clarity and conciseness.

Figure 1:
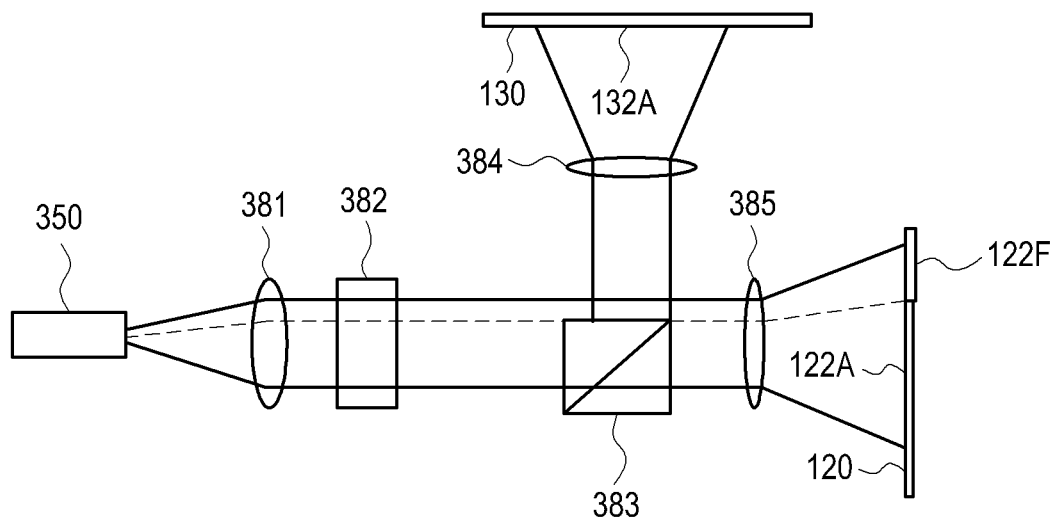
FIG. 1 illustrates the configuration of a conventional projector.
Figure 2:
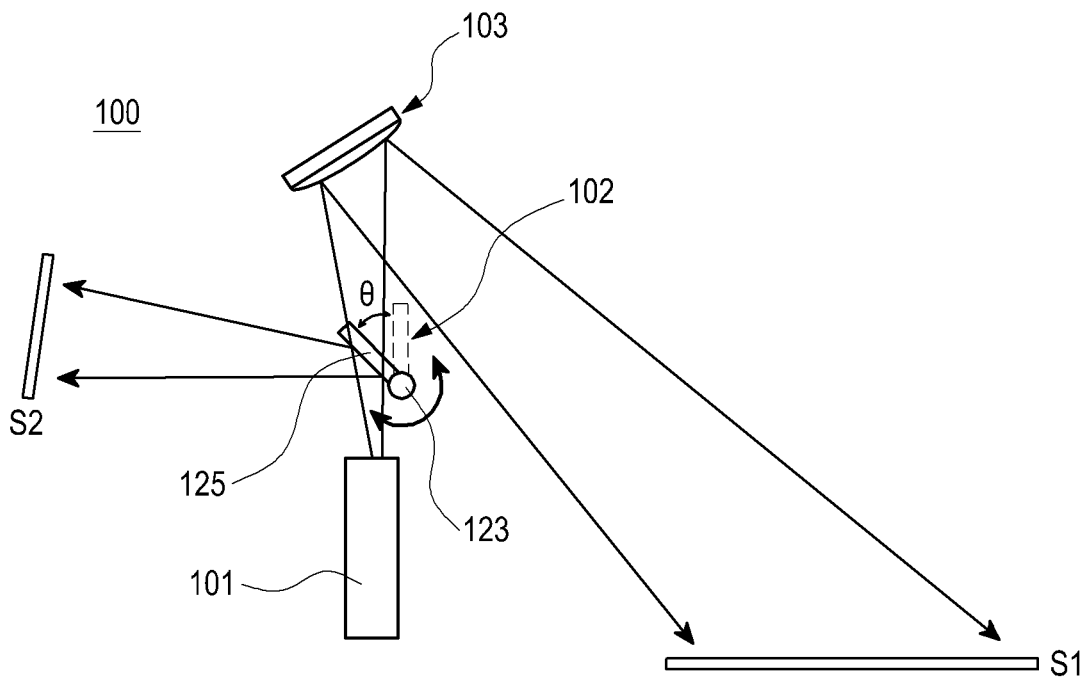
FIG. 2 illustrates the configuration of a projector according to an embodiment of the present invention.

Referring to FIG. 2, a projector 100 according to an embodiment of the present invention includes an optical module 101 and an optical path switch 102.

While not shown, the optical module 101 includes a light source, an optical illumination system, an image panel, and an optical projection system, as will be easily understood to those skilled in the art. The optical module 101 emits information about a plurality of different pictures or images (hereinafter, described in the context of images) alternately at intervals. More specifically, the optical module 101 alternates between first image information (E1 in FIG. 5, which will be referred to throughout this description) and second image information (E2 in FIG. 5) at intervals.

The optical path switch 102 is installed such that the optical path switch 102 may switch on or off from a traveling path of image information emitted from the optical module 101. Accordingly, the optical path switch 102 is positioned on the traveling path of image information and thus reflects or refracts the image information ('on' state) or the optical path switch 102 is out of the traveling path of image information and thus passes the image information ('off' state).

When the optical path switch 102 is off, the first image information E1 is emitted and travels in an original path (hereinafter a first path), that is, a path in which the first image information E1 is emitted from the optical module 101, without interference from the optical path switch 102. When the optical path switch 102 is on, the second image information E2 is emitted and reflected or refracted from the optical path switch 102, out of the original path, that is, the path in which the second image information E2 is emitted from the optical module 101 and travels straight, thus taking a second path.

Consequently, while the first image information E1 is being emitted, the optical path switch 102 is off from the traveling path of the first and second image information E1 and E2. While the second image information E2 is being emitted, the optical path switch 102 is on the traveling path of the first and second image information E1 and E2. Therefore, the first image information E1 travels straight along the emission path of the optical module 101, whereas the second image information E2 is reflected from the optical path switch 102 and thus travels along the second path. If first and second screens S1 and S2 are disposed at appropriate positions, the first and second image information E1 and E2 can be projected onto the different screens S1 and S2.

The first and second image information E1 and E2 may be identical or different. In the former case, a user may use the projector conveniently in a briefing or presentation. Specifically, the user may host a briefing or presentation, viewing the first screen S1 onto which the first image information E1 is projected, while participants are viewing the second screen S2 onto which the second image information E2 is projected. Although the first and second image information E1 and E2 is identical, the image quality of the first and second image information E1 and E2 is not degraded because it is emitted independently from the optical module 101.

On the contrary, if the first and second information E1 and E2 is different, an Internet screen, a game screen, or a Television (TV) screen may be created with the second image information E2, while an input device such as a computer keyboard, a control panel, or a TV remote controller may be implemented with the first image information E1. While not shown, when an input device is configured using the first image information E1, a sensor for sensing a user's key manipulation or input is preferably installed. In addition, if the first and second image information E1 and E2 is different, participants in a briefing or presentation may view a briefing or presentation material by projecting the second image information E2 onto the second screen S2, while a presenter may view a script or notes regarding the briefing or presentation material or additional material excluded from the second image information E2 by projecting the first image information E1 onto the first screen S1.

Figure 3:
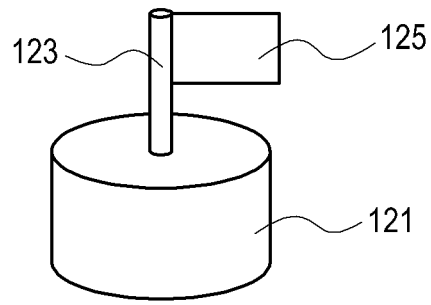
FIG. 3 is a perspective view of an optical path switch illustrated in FIG. 2.
Figure 4:
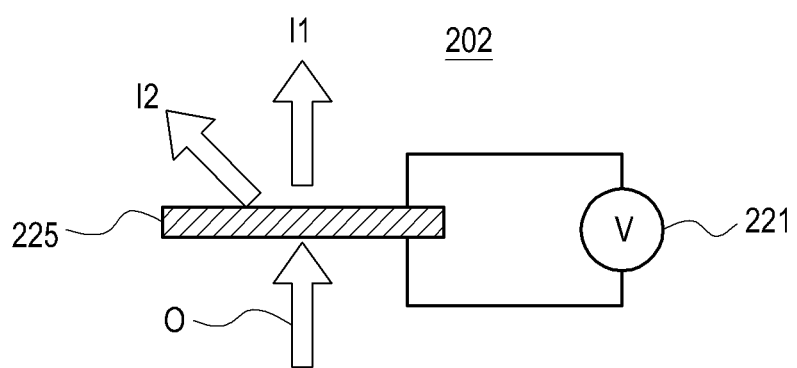
FIG. 4 illustrates a modification of the optical path switch illustrated in FIG. 2 according to an embodiment of the present invention.

FIGS. 3 and 4 illustrate optical path switches 102 and 202, respectively.

Specifically, FIG. 3 illustrates the optical path switch 102 illustrated in FIG. 2. Referring to FIG. 3, the optical path switch 102 includes a driver 121 and a reflection mirror 125. The driver 121 may rotate the reflection mirror 125 at intervals. As the reflection mirror 125 is on the traveling path of image information emitted from the optical module 101, the second image information E2 travels along the second path. The driver 121 is preferably a step motor and the reflection mirror 125 is rotatably attached to a rotation shaft 123 of the step motor.

While the reflection mirror 125 is shown as extended in one direction from the rotation shaft 123 in FIG. 3, the reflection mirror 125 may be arranged symmetrically with respect to the rotation shaft 123. If the reflection mirror 125 is asymmetrical with respect to the rotation shaft 123, the center of gravity of the reflection mirror 125 is out of the rotation shaft 123. Thus, external force is continuously applied to the rotation shaft 123 when it rotates. This may be prevented by symmetrically aligning the reflection mirror 125 relative to the rotation shaft 123.

The reflection mirror 125 may be configured so as to reciprocate only within an angle range θ, rather than to always rotate 360 degrees. Thus, the influence of external force applied to the rotation shaft 123 decreases despite operation of the driver 121. In this case, the reflection mirror 125 may be asymmetrically configured. In this embodiment, the angle range within which the reflection mirror 125 reciprocates is set to 45 degrees and thus the second image information E2 can travel directly in the second path.

In the optical path switch 102 having the above-described configuration, the step motor may have a diameter of 8 mm or less and the reflection mirror 125 may be of a size of about 5×5 mm. It is possible to control the power consumption of the step motor below 200 mW. The optical path switch 102 having the above size and power consumption can be mounted on a portable terminal such as a mobile phone.

FIG. 4 illustrates a modification of the optical path switch illustrated in FIG. 2 according to the present invention. In FIG. 4, the optical path switch 202 adopts a Switchable Brag Grating (SBG) 225 that is connected to a power supply 221. When power is supplied to the SBG 225, the SBG 225 transmits image information in a direction I1. If power is disconnected to the SBG 225, the SBG 225 refracts the image information in a direction I2. In other words, the SBG transmits or refracts image information due to the difference between the refractive indexes of a grating and liquid crystals according to a driving voltage. Therefore, the SBG 225 always lies on the traveling path of image information emitted from the optical module 100 and transmits or refracts incident image information depending on power supply or disconnection, or depending on a voltage applied to the SBG 225.

Although the SBG 225 to which power is supplied is in the on state, the SBG 225 transmits the image information in the direction I1 and thus the projector 100 switches off the optical path switch 202. Likewise, when power is cut to the SBG 225, the SBG 225 is in the off state and refracts image information in the direction I2. At that point, the optical path switch 202 is in the on state in the projector 100.

The projector 100 may further include a convex mirror 103, as shown in FIG. 2. The convex mirror 103 is positioned on the travelling path of the first image information E1, for magnifying an image represented by the first image information E1 passed through the optical path switch 102 while the first image information E1 is projecting. The convex mirror 103 may be replaced with a concave lens (not shown), for magnifying an image represented by image information in the same traveling path.

The first image information E1 is projected onto the first screen S1 through the optical path switch 102, and the second image information E2 is reflected from the optical path switch 102 and then projected onto the second screen S2. While a larger image is displayed on the first screen S1 than on the second screen S2 in FIG. 2, a larger image is displayed preferably on the second screen S2 because the second image information E2 is displayed for an audience in a briefing or a presentation. However, the user of the projector 100 hosting the briefing or presentation primarily views an image represented by the first image information E1; thus, it is not necessary to project a larger image onto the first screen S1.

The user directly manipulates either the projector 100 or an input device configured on the first screen S1 during the briefing or presentation in progress. Therefore, the projector 100 is positioned near the first screen S1, sufficiently apart from the second screen S2.

Accordingly, as the convex mirror 103 or a concave lens is positioned on the traveling path of the first image information E1 and projects only the first image information E1, magnifying an image represented by the first image information E1, an image of an input device having a large enough width for the user to manipulate can be displayed on the first screen S1, while a projection distance is short.

Although the convex mirror 103 or the concave lens is installed on the traveling path of the first image information E1 in the above-described embodiment, it will be readily understood to those skilled in the art that the convex mirror 103 or the concave lens can be installed on the traveling length of the second image information E2.

Meanwhile, the throw ratio of the first image information E1 is smaller than that of the second image information E2. A throw ratio is defined as the distance that a projector is placed from a screen divided by the width of an image that it projects. This is because a large image can be displayed from a short projection distance by installing the concave mirror 103 or the convex lens on the traveling path of the first image information E1. In other words, when a projection length is given, an image represented by the first image information E2 is magnified by the convex mirror 103 or the concave lens, thereby reducing the throw ratio of the first image information E1. Therefore, even though the projector 100 is located close enough for the user to manipulate, the user may use an input device projected as an image of a sufficient size.

Herein, the throw ratios of the first image information E1 and the second image information E2 are about 0.5 and about 1.6, respectively. As previously stated, the throw ratio of the first image information E1 may be controlled according to the curvature of the convex mirror 103 or the concave lens. Even though the curvature of the convex mirror 103 or the concave lens is adjusted, it is preferred to maintain the throw ratio of the second image information E2 three times larger than that of the first image information E1. Thus, the user can set and use input devices projected with the first image information E1, using the projector 100 placed nearby.

When an image large enough for several persons to view from a distance of 10 m or less is projected onto a screen, a projector is placed far enough from the screen. In this case, the throw ratio of the second image information E2 is preferably large.

Figure 5:
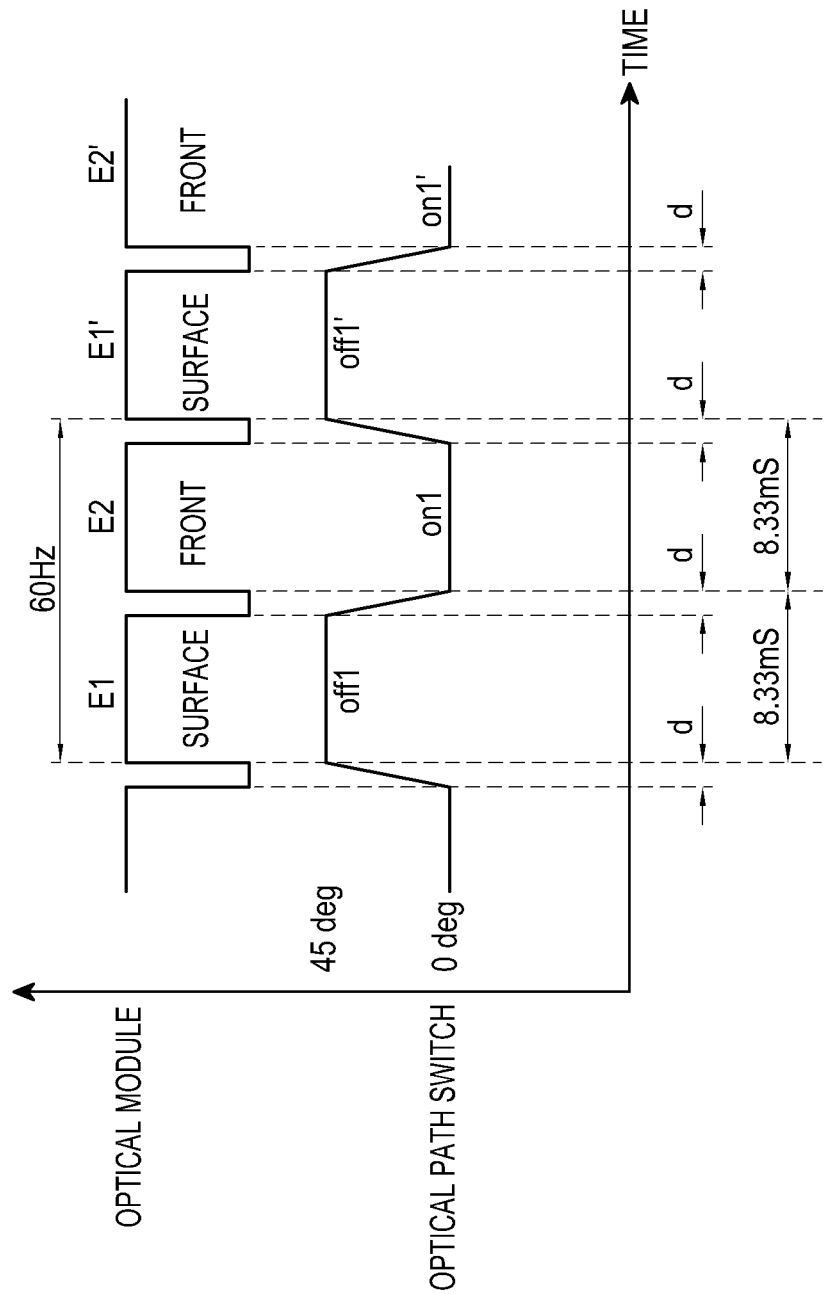
FIG. 5 is referred to for describing a method for operating the projector illustrated in FIG. 2.

FIG. 5 illustrates a graph showing of operation timing of the projector 100 illustrated in FIG. 2. That is, emission of image information from the optical module 101 and an operation of the optical path switch 102 with passage of time are illustrated as a graph.

Although the graph of FIG. 5 demonstrates that the optical module 101 emits image information at 120 Hz, considering alternate output of a surface image projected onto the first screen S1 and a front image projected onto the second screen S2, image information corresponding to each of the surface image and the front image is emitted at 60 Hz. A dead time d preferably is prior to first image information E1 and intervenes between first image information E1 and following second image information E2, between the second image information E2 and the following first image information E1' and between the first image information E1' and following second image information E2'. During the dead time d, image information is not emitted. The use of the dead time d is for preventing interference between the first and second image information E1, E2, E1' and E2'.

The reflection mirror 125 of the optical path switch 102 may rotate from a 0-degree position to a 45-degree position. The 0-degree position is indicated by a solid line in FIG. 2. At the 0-degree position, the optical path switch 102 is on the traveling path of image information. The 45-degree position is indicated by a dotted line in FIG. 2. At the 45-degree position, the optical path switch 102 is off from the traveling path of image information.

The optical path switch 102 may be on/off during the dead time d. That is, after the optical path switch 102 is perfectly placed on the traveling path of image information, the second image information E2 is emitted. In addition, after the optical path switch 102 is out of the traveling path of image information, the first image information E1 is emitted. This is possible to tune the frequency at which image information is emitted from the optical module 101 to the frequency at which the optical path switch 102 operates. In other words, the optical path switch 102 repeats an on/off operation at 60 Hz during the dead time d. During a time period when the first or second image information E1 or E2 is emitted, the optical path switch 102 is either directly on or off from the traveling path of image information.

A method for operating the projector 100 may involve first emission, first path control, second emission, and second path control.

In the first emission step, the optical module 101 emits the first image information E1 at 120 Hz. Since the first and second image information E1 and E2 alternate, they are each emitted at 60 Hz.

In the first path control step off1 and off1', the optical path switch 102 is placed off from the traveling path of the image information, while the first image information E1 is being emitted. During the dead time d shortly before emission of the first image information E1, the optical path switch 102 is switched off from the traveling path of the image information. In FIG. 5, inclined parts of the operation graph of the optical path switch 102 indicate an operation for entering or exiting from the traveling path of image information.

The first emission step and the first path control step off1 and off1' are simultaneously performed. Thus, the first image information E1 passes through the optical path switch 102 and proceeds straight, taking the original path, that is, the path in which the first image information E1 is emitted from the optical module 101 and travels.

In the second emission step, the optical module 101 emits the second image information E2. In the second path control step on1 and on1', the optical path switch 102 has directly entered the traveling path of image information. The second emission step and the second path control step on1 and on1' are simultaneously performed. Therefore, the second image information E2 travels in the second path by means of the optical path switch 102, particularly the reflection mirror 125.

Preferably, a non-emission of image information step is further performed during the dead time d when transition occurs between the first and second emission steps, to prevent mutual interference between the first and second image information E1 and E2 and to prevent projection of, for example, the shadow of the optical path switch 102 when the optical path switch 102 enters or exits from the traveling path of image information.

For example, when the optical path switch 102 enters the traveling path of image information while the first image information E1 is being projected onto the first screen S1, an image represented by the first image information E1 is projected as gradually eclipsed by the shadow of the optical path switch 102 and an image of the eclipsed part is projected onto the second screen S2. When the optical path switch 102 exits from the traveling path of image information while the second image information E2 is being projected onto the second screen S1, an image represented by the second image information E2 disappears gradually on the second screen S2, and the image represented by the second image information E2 is gradually projected together with the shadow of the optical path switch 102 on the first screen S1. Therefore, it is preferred to complete the entering/exit operation of the optical path switch 102 during the dead time d.

The first path control step off1 and off1' and the second path control step on1 and on 1' are performed by rotating the reflection mirror 125 using the driver 121 such as a step motor, or by supplying or disconnecting power to the SBG 225 connected to the power supply 221. The optical path switches 102 and 202 lead the first image information E1 straight, or reflect or refract the second image information E2.

The above operation method may further include a third path control step by disposing the convex mirror 103 or the concave lens. In the third path control step, the first image information E1 passed through the optical path switch 102 is magnified and reflected, or magnified and transmitted. After the third path control step, an image represented by the first image information E1 is magnified.

As is apparent from the above description, since one of the first and second image information alternately emitted from the optical module is switched to another path by means of the optical path switch in the projector of the present invention, a user perceives two different images as displayed simultaneously on the single projector. Therefore, images projected onto the first and second screens can be combined in various manners. In addition, if an image of an input device such as a keyboard is projected on the first screen and a sensor for sensing a user's manipulation or operation is provided, an Internet screen, a game screen, or a multimedia screen may be configured on the second screen and thus may be manipulated through the first screen.

While the present invention has been particularly shown and described with reference to embodiments thereof, it will be understood by those of ordinary skill in the art that various changes in form and details may be made therein without departing from the spirit and scope of the present invention as defined by the following claims.

For example, while it has been described herein that image information emitted from the optical module 101 is set to 120 Hz and the first and second image information are alternately emitted, this may be controlled in the process of product fabrication so as to achieve optimum image quality.

What is claimed is:

1. A projector for emitting a plurality of pieces of optical image information, comprising:
   an optical module for alternately emitting first image information and second image information at intervals, the first image information and the second image information are alternately emitted from the optical module at a first frequency; and
   an optical path switch installed to be switched on or off from a traveling path of the first and second image information emitted from the optical module, the optical path switch operating at a second frequency,
   wherein the second frequency is tuned to the first frequency,
   wherein while the first image information is being emitted, the optical path switch is switched off from the traveling path of the first and second image information, whereby the first image information travels directly in an emission path of the optical module, the emission path being a first path, and while the second image information is being emitted, the optical path switch is switched on to the traveling path of the first and second image information, whereby the second image information travels in a second path by the optical path switch, and
   wherein the optical module does not emit image information during a dead time which is based on a time it takes for the optical path switch to move between a switched on configuration to a switched off configuration.

2. The projector of claim 1, wherein a throw ratio of the second image information is three or more times larger than a throw ratio of the first image information.

3. The projector of claim 2, further comprising a convex mirror for reflecting the first image information that passes through the optical path switch and travels straight.

4. The projector of claim 1, wherein a throw ratio of the second image information is 1.6 and a throw ratio of the first image information is 0.5.

5. The projector of claim 4, further comprising a convex mirror for reflecting the first image information that passes through the optical path switch and travels straight.

6. The projector of claim 1, wherein the optical path switch comprises:
   a driver; and
   a reflection mirror rotatably attached to the driver, for rotating by the driver, wherein the second image information is reflected from the reflection mirror and travels in the second path.

7. The projector of claim 6, wherein the reflection mirror reciprocates within a 45-degree angle range.

8. The projector of claim 6, wherein the driver is a step motor.

9. The projector of claim 1, wherein the optical path switch is a Switchable Brag Grating (SBG), and wherein when power is supplied to the SBG, the first image information travels in the first path and when power is disconnected to the SBG, the second image information is refracted from the SBG and travels in the second path.

10. A method for operating a projector, comprising:
    emitting, as a first emission, first image information from an optical module;
    controlling, in a first path control, the first image information such that the first image information travels straight in a first path in which the first image information is emitted from the optical module by switching off from an optical path switch from a traveling path of the first image information emitted from the optical module;

emitting, as a second emission, second image information from the optical module;

switching, in a second path control, the second image information from a path in which the second image information is emitted from the optical module to a second path by switching on the optical path switch to a traveling path of the second image information; and emitting no image information during a dead time which is based on a time it takes for the optical path switch to move between a switched on configuration to a switched off configuration, wherein the first emission and the first path control are simultaneously performed and the second emission and the second path control are simultaneously performed, wherein the first emission alternates with the second emission at intervals, and wherein an operation frequency of the optical path switch is tuned to a frequency at which the first image information and the second image information are alternately emitted from the optical module.

11. The method of claim 10, further comprising reflecting, in a third path control, the first image information from a convex mirror.

12. The method of claim 10, wherein each of the first path control and the second path control includes rotating a reflection mirror rotatably attached to a driver.

13. The method of claim 12, wherein the driver is a step motor and the optical path switch is switched on or off by moving the reflection mirror in a reciprocating motion within a 45-degree angle range.

14. The method of claim 10, wherein the optical path switch is a Switchable Brag Grating (SBG), and each of the first path control and the second path control comprises selectively supplying power to the SBG, wherein when power is supplied to the SBG, the first image information travels in the first path and when power is disconnected to the SBG, the second image information is refracted from the SBG and travels in the second path.

\* \* \* \* \*